United States Patent
Mikami et al.

(10) Patent No.: US 8,455,571 B2
(45) Date of Patent: Jun. 4, 2013

(54) FLAME-RETARDANT PARTICLE, RESIN COMPOSITION AND RESIN FORMED BODY

(75) Inventors: Masato Mikami, Kanagawa (JP); Masayuki Okoshi, Kanagawa (JP); Kazuya Yamanoi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 962 days.

(21) Appl. No.: 12/169,932

(22) Filed: Jul. 9, 2008

(65) Prior Publication Data

US 2009/0088495 A1    Apr. 2, 2009

(30) Foreign Application Priority Data

Oct. 2, 2007   (JP) ................. 2007-259084

(51) Int. Cl.
*C08K 9/10* (2006.01)
*C08K 9/02* (2006.01)

(52) U.S. Cl.
USPC ........... 523/204; 427/180; 427/195; 427/224; 427/393.3; 428/357; 428/402; 428/403; 428/407; 428/920; 428/921; 523/200; 523/201; 523/220; 523/221; 523/223; 523/205; 523/206; 523/207

(58) Field of Classification Search
USPC ............... 427/180, 195, 224, 393.3; 428/357, 428/402, 403, 407, 920, 921; 523/200, 201, 523/204, 220, 221, 223, 205, 206, 207
See application file for complete search history.

(56) References Cited

U.S. PATENT DOCUMENTS

| | | | |
|---|---|---|---|
| 2002/0051884 A1* | 5/2002 | Lubnin et al. | 428/407 |
| 2004/0010066 A1* | 1/2004 | Devine | 524/409 |
| 2004/0127603 A1* | 7/2004 | Lean et al. | 523/201 |
| 2005/0228075 A1* | 10/2005 | Gogos et al. | 523/220 |
| 2006/0293415 A1* | 12/2006 | Miyamoto et al. | 523/212 |

FOREIGN PATENT DOCUMENTS

| | | |
|---|---|---|
| JP | A-53-74557 | 7/1978 |
| JP | A-54-91557 | 7/1979 |
| JP | A-62-15256 | 1/1987 |
| JP | A-5-70623 | 3/1993 |
| JP | A-8-48812 | 2/1996 |
| JP | A-8-81583 | 3/1996 |
| JP | A-8-231517 | 9/1996 |
| JP | A-11-29662 | 2/1999 |
| JP | A-2001-152030 | 6/2001 |
| JP | 2004-331709 | * 11/2004 |

OTHER PUBLICATIONS

Pfeffer, Powder Technology, 117 (2001) 40-67.*

* cited by examiner

*Primary Examiner* — Robert C Boyle
(74) *Attorney, Agent, or Firm* — Oliff & Berridge, PLC

(57) ABSTRACT

A flame-retardant particle includes: a particle containing a compound having a structure represented by formula (1); and a coating particle that covers at least a part of a surface of the particle:

$$-A(-O-CO-O-Ar)_m \quad (1)$$

wherein A represents a substituted or unsubstituted aromatic group; Ar represents a substituted or unsubstituted phenyl group; and m represents an integer of 1 to 3.

15 Claims, 2 Drawing Sheets

FLAME-RETARDANT PARTICLE, RESIN COMPOSITION AND RESIN FORMED BODY

CROSS-REFERENCE TO RELATED APPLICATION

This application is based on and claims priority under 35 USC 119 from Japanese Patent Application No. 2007-259084 filed Oct. 2, 2007.

BACKGROUND

Technical Field

The present invention relates to a flame-retardant particle, a resin composition and a resin formed body.

According to an aspect of the invention, there is provided a flame-retardant particle, including: a particle containing a compound having a structure represented by formula (1); and a coating particle that covers at least a part of a surface of the particle:

wherein A represents a substituted or unsubstituted aromatic group; Ar represents a substituted or unsubstituted phenyl group; and m represents an integer of 1 to 3.

BRIEF DESCRIPTION OF THE DRAWINGS

Exemplary embodiments of the present invention will be described in detail based on the following figures, wherein.

DETAILED DESCRIPTION

Figure 1:
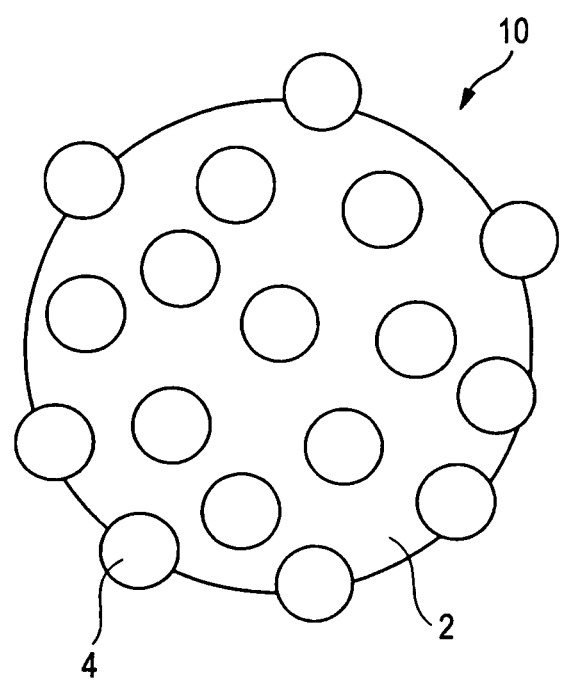
FIG. 1 illustrates an outer appearance view showing one exemplary embodiment of the flame-retardant particle of the present invention.

Preferred exemplary embodiments are described in detail below possibly by referring to the drawings.

(Flame-Retardant Particle)

FIG. 1 is an outer appearance view showing the flame-retardant particle according to the first exemplary embodiment. The flame-retardant particle 10 shown in FIG. 1 comprises a particle 2 containing a compound having a structure represented by the following formula (1) (hereinafter, this particle is sometimes referred to as a "core particle") and a coating particle 4 that covers at least a part of the surface of the core particle 2.

[wherein A represents a substituted or unsubstituted aromatic group, A represents a substituted or unsubstituted phenyl group, and m represents an integer of 1 to 3].

The flame-retardant particle 10 according to this exemplary embodiment is used in the same usage as that of the conventional flame retarder, for example, is dispersed in a resin to impart flame retardance. In the flame-retardant particle 10 according to this exemplary embodiment, the structure represented by formula (1) in the core particle 2 forms a carbonized layer (char) at the burning, so that the cycle of burning reaction can be prevented and flame retardance is brought out. Also, in the flame-retardant particle 10 according to this exemplary embodiment, the core particle 2 is covered by the coating particle 4, so that as compared with the case of being not covered by a coating particle 4, aggregation of flame-retardant particles 10 with each other can be suppressed. This is considered to result because when the core particle 2 is not covered by a coating particle 4, core particles 2 are put into direct contact with each other and the compounds having a structure represented by formula (1) are crosslinked between contacted core particles 2 to readily cause binding of core particles 2, whereas when at least a part of the surface of the core particle 2 is covered by a coating particle 4, core particles 2 are prevented from coming into direct contact with each other and binding of core particles 2 is suppressed.

In formula (1), A represents a substituted or unsubstituted aromatic group. The substituent is not particularly limited, but examples thereof include an alkyl group having a carbon number of 1 to 10, a phenyl group, an alkoxyl group, an amino group, an amido group, an aryl group, an acyl group, a vinyl group, an allyl group, a hydroxy group, an ester group and a carboxyl group. Also, the substituent is not particularly limited in the number and the position.

In formula (1), Ar represents a substituted or unsubstituted phenyl group. The substituent is not particularly limited, but examples thereof include an alkyl group having a carbon number of 1 to 10, a phenyl group, an alkoxyl group, an amino group, an amido group, an aryl group, an acyl group, a vinyl group, an allyl group, a hydroxy group, an ester group and a carboxyl group. Also, the substituent is not particularly limited in the number and the position. In formula (1), m represents an integer of 1 to 3.

In producing the compound having a structure represented by formula (1), for example, an aromatic compound described below is used. Examples of the aromatic compound include cresol, aminophenol, hydroxybenzonitrile, hydroxybenzaldehyde, dimethylphenol, nitrosophenol, 5-amino-2-methoxyphenol, 2-methoxy-5-nitrophenol, 2-methoxy-4-nitrophenol, 2-amino-3-methylphenol, difluorophenol, hydroquinone, hydroxybenzenephenone, hydroxybenzyl alcohol, phenylhydroquinone, 4-nitro-1,2-benzenediol, 3,5-dinitro-1,2-benzenediol, 3-methyl-1,2-benzenediol, phloroglucinol, phloroglucinolcarboxylic acid, 4,6-dinitro-1,2,3-benzenetriol, hydroxybenzenesulfonic acid and a salt thereof, 3-amino-4-hydroxybenzenesulfonic acid and a salt thereof, 3-amino-4-hydroxy-5-nitrobenzenesulfonic acid and a salt thereof, 4-hydroxy-3-nitroso-1-naphthalenesulfonic acid and a slat thereof, 4,5-hydroxy-1,3-benzenedisulfonic acid and a salt thereof, 4,5-hydroxy-5-nitro-1,3-benzenedisulfonic acid and a salt thereof, 4,4'-thiodiphenol, resorcinol sulfide, 4,4'-sulfonyldiphenol, resorcinol sulfoxide, 4,4'-sulfonylbis(2-methylphenol), 4,4'-sulfonylbis(2,6-dimethylphenol), bisphenol A, 4,4'-dihydroxydiphenyl ether, 4,4'-ethylidenebisphenol, 4,4'-propylidenebisphenol, 2,2-bis-(4-hydroxyphenyl)-butane, 2,2-bis(4-hydroxy-3-methylphenyl)propane, 1,1,1-tris(4-hydroxyphenyl)ethane, poly(4-vinylphenol), poly(3-vinylphenol), poly(2-vinylphenol), phenol resin and lignophenol.

Such an aromatic compound and a compound having a characteristic group represented by —CO—O—Ar in formula (1) are reacted, whereby the compound having a structure represented by formula (1) is obtained.

Examples of the compound having the above-described characteristic group include phenyl chloroformate and phenyl bromoformate, with phenyl chloroamate being preferred.

The reaction of the aromatic compound and the compound having the above-described characteristic group is performed in the presence of an amine which is a reaction accelerator.

The amine is not particularly limited, but examples thereof include triethylamine, diethylaniline, pyridine, dimethylaniline, quinoline, and N,N,N',N'-tetramethylethylenediamine.

Other than the reaction above, a melt trans-esterification of a diaryl carbonate in the presence of a basic catalyst may also be performed. The diaryl carbonate is not particularly limited, but examples thereof include diphenyl carbonate. Also, the basic catalyst is not particularly limited, but examples thereof include an alkali metal, an alkaline earth metal, a basic metal compound such as zinc oxide, a metal carbonate, a metal acetate, a metal hydride, a quaternary ammonium salt, a phosphonium salt, and 4-di-methylaminopyridine.

In this exemplary embodiment, the core particle 2 contains at least a compound represented by formula (1) but preferably further contains at least one kind of a flame retarder selected from the group consisting of conventionally known phosphorus-based flame retarders and nitrogen-based flame retarders.

Examples of the phosphorus-based flame retarder include an organic phosphorus-based compound such as phosphoric acid ester (e.g., triphenyl phosphate, methyl neobenzyl phosphate, pentaerythritol diethyl diphosphate, methyl neopentyl phosphate, phenyl neopentyl phosphate, pentaerythritol diphenyl diphosphate, dicyclopentyl hypodiphosphate, dineopentyl hypophosphite, phenyl pyrocatechol phosphite, ethyl pyrocatechol phosphate, dipyrocatechol hypodiphosphate), condensed phosphoric acid ester, phosphate and polyphosphate; and red phosphorus.

Examples of the nitrogen-based flame retarder include an aliphatic amine compound, an aromatic amine compound, a nitrogen-containing heterocyclic compound, a cyan compound, an aliphatic amide, an aromatic amide, melamine cyanurate, melamine isocyanurate, urea, and thiourea.

From the standpoint of enhancing the flame retardance, the flame retarder is preferably one which decomposes at a temperature lower than the decomposition temperature of the resin used in the later-described resin composition or resin formed body.

In the case where the core particle 2 contains the above-described flame retarder, the flame retarder content is preferably 1 mass % or more, more preferably 5 mass % or more, based on the entire amount of the core particle 2. If the content is less than 1 mass %, the flame retardance-enhancing effect by the incorporation of the flame retarder into the core particle 2 tends to be hardly obtained.

In this exemplary embodiment, the coating particle 4 is not particularly limited as long as it can suppress the aggregation of core particles 2. Examples of the coating particle 4 include an inorganic particle, an organic particle and a metal particle. Here, examples of the inorganic particle include a particle comprising an inorganic material or an inorganic material complex, a particle comprising clay, a particle comprising fullerene or carbon nanotube, and a particle comprising a hydrated metal compound. Examples of the organic particle include a particle comprising an organic polymer or a dendrimer.

Examples of the particle comprising an inorganic material include a particle comprising basic lead carbonate, basic lead sulfate; lead sulfate; lithopone; zinc sulfide; calcium carbonate; gypsum; basic magnesium carbonate; or an inorganic oxide such as muscovite, micanite, micalex, zinc oxide, titanium oxide, antimony oxide, zirconium oxide, alumina, quartz, clay, silica, silicic acid, diatomaceous earth, talc, alumina white, gloss white, and satin white.

Examples of the particle comprising clay include a particle comprising beidellite, nontronite, saponite, hectorite, bentonite, or a derivative thereof.

Examples of the particle comprising fullerene or carbon nanotube include C60, C70, C120, C180, C82, C60F20, C60F18, or a derivative thereof.

The particle comprising a dendrimer is not particularly limited as long as it is a particle comprising a resinous polymer, but is preferably a particle comprising a dendrimer of third or greater generation.

Examples of the particle comprising an organic polymer include a particle comprising, in the case of a synthetic material, a polymer material such as polystyrene, polyacrylic acid derivative, polyacrylic acid derivative, polyethylene, polypropylene, phenol resin, furan resin, xylene-formaldehyde resin, urea resin, melamine resin, aniline resin, alkyd resin, unsaturated polyester, epoxy resin, poly-p-xylylene, polyvinyl acetate, acrylic resin, methacrylic resin, polyvinyl chloride, polyvinylidene chloride, fluorine-based plastic, polyacrylonitrile, polyvinyl ether, polyvinyl ketone, polyether, polycarbonate, thermoplastic polyester, polyamide, diene-based plastic, polyurethane-based plastic, polyphenylene, polyphenylene oxide, polysulfone, aromatic heterocyclic polymer, silicone, natural rubber-based plastic, or a mixed material (polymer blend) of two or more kinds of these polymer materials.

As for the particle comprising a naturally-occurring organic polymer, mainly polysaccharides are preferably used, and examples of the particle include a particle comprising a natural polymer such as xanthan gum, agarose, agaropectin, amylose, sodium alginate, propylene glycol alginate, isolichenan, insulin, ethyl cellulose, ethyl hydroxyethyl cellulose, curdlan, casein, carrageenan, carboxymethyl cellulose, carboxymethyl starch, callose, agar, chitin, chitosan, silk fibroin, guar gum, quince seed, Crown Gall polysaccharide, glycogen, glucomannan, keratan sulfate, keratin protein, collagen, cellulose acetate, gellan gum, schizophyllan, gelatin, ivory nut mannan, tunicin, dextran, dermatan sulfate, starch, tragacanth gum, nigeran, hyaluronic acid, hydroxyethyl cellulose, hydroxypropyl cellulose, pustulan, funoran, degraded xyloglucan, pectin, porphyran, methyl cellulose, methyl starch, laminaran, lichenan, lentinan and locust bean gum.

Examples of the metal particle include a particle comprising a metal material such as zinc, alumel, antimony, aluminum, aluminum alloy, iridium, indium, osmium, chromium, chromel, cobalt, zirconium, stainless steel, gold, silvex, nickel silver, copper, bronze, tin, tungsten, tungsten steel, iron, lead, nickel, nickel alloy, nickelin, platinum, platinum-rhodium, tantalum, duralumin, nichrome, titanium, Krupp austenite steel, constantan, brass, platinum-iridium, palladium, palladium alloy, molybdenum, molybdenum steel, manganese, manganese alloy, rhodium and rhodium-gold.

The shape of the coating particle 4 is not particularly limited and, for example, a particle in a spherical, ellipsoidal, polyhedral, porous body-like, starlike, acicular, hollow or amorphous form may be used.

In this exemplary embodiment, from the standpoint of flame retardance, a fine particle comprising an inorganic substance is preferably used as the coating particle 4.

The flame-retardant particle 10 according to the present exemplary embodiment is produced, for example, by the following wet process or dry process.

In the wet process, a compound having a structure represented by formula (1) and a flame retarder which is used, if desired, are dissolved or dispersed in a solvent such as ethyl acetate, the resulting solution is particulated by suspending and stirring it in water where a coating particle 4 is dispersed, and the solvent is removed under heating at a temperature of about 80° C. with stirring and suspending the system, whereby a flame-retardant particle 10 with at least a part of the core particle 2 surface being covered by the coating particle 4 is produced. Incidentally, examples of the solvent other than ethyl acetate include toluene, carbon tetrachloride and chloroform. Also, the heating temperature at the removal of solvent is adjusted according to the solvent used, but usually, the removal of solvent is preferably performed at a temperature of 100° C. or less.

In the dry process, a compound having a structure represented by formula (1) and a flame retarder which is used, it desired, are particulated to form a core particle 2, the core particle 2 and a coating particle 4 are mixed, and the mixture is mechanically stirred, whereby a flame-retardant particle 10 with at least a part of the core particle 2 surface being covered by the coating particle 4 is produced.

In this exemplary embodiment, the content of the coating particle 4 in the flame-retardant particle 10 is preferably from 5 to 100 parts by mass, more preferably from 10 to 80 parts by mass, per 100 parts by mass of the core particle 2. If the content of the coating particle 4 is less than 5 parts by mass, aggregation of flame-retardant particles 10 with each other readily occurs and this tends to bring about reduction in the flame retardance and mechanical strength, whereas if the content exceeds 100 parts by mass, the amount of the core particle 2 is relatively decreased and insufficient formation of a carbonized layer tends to result at the burning, giving rise to reduction in the flame retardance. Incidentally, when the content of the coating particle 4 is in the above-described range, the core particle 2 enters a state of its surface being properly covered by the coating particle 4, and the core particles 2 are more satisfactorily prevented from coming into direct contact with each other among a plurality of flame-retardant particles 10, as a result, both the flame retardance and the mechanical strength are satisfied in a high level.

The flame retardant particle 10 in this exemplary embodiment preferably has a volume average particle diameter (when the flame-retardant particle is non-spherical, an average diameter of its circumscribed circle) of 5 μm or less, more preferably from 500 nm to 5 μm, still more preferably from 500 nm to 3 μm. Incidentally, the volume average particle diameter is measured by a laser Doppler heterodyne particle size distribution meter (MICROTRAC-UPA150, trade name, produced by Nikkiso Co., Ltd.). If the volume average particle diameter is less than 500 nm, the flame retardance-holding capability tends to decrease when added to a resin, whereas if it exceeds 5 μm, a large amount of the flame-retardant particle needs to be added in a resin so as to obtain sufficiently high flame retardance and this tends to cause reduction in the mechanical properties of the resin formed body.

The volume average particle diameter of the coating particle 4 is preferably ⅕ or less of the volume average particle diameter of the core particle 2, more preferably 1/10 or less of the volume average particle diameter of the core particle 2 and 1 nm or more. If the volume average particle diameter of the coating particle 4 exceeds ⅕ of the volume average particle diameter of the core particle 2, the effect of the coating particle 4 becomes large and the flame retardance may decrease.

Also, in the flame-retardant particle 10 according to the present exemplary embodiment, the compound represented by formula (1) may form a crosslinked structure in the core particle 2. When the core particle 2 has a crosslinked structure inside thereof, the particle becomes hardly soluble in a solvent and ease of remaining of the carbonized layer at the burning is enhanced, as a result, flame retardance is more effectively obtained.

(Resin Composition)

The resin composition according to the second exemplary embodiment comprises a resin and the above-described flame-retardant particle 10.

The resin for use in the resin composition is not particularly limited, but examples thereof include an acrylonitrile-butadiene-styrene copolymer (ABS), methylpentene, a thermoplastic vulcanized elastomer, a thermoplastic polyurethane, a styrene-isoprene-styrene block copolymer, silicone, a styrene-ethylene-propylene-styrene block copolymer, a styrene-ethylene-butylene-styrene block copolymer, a styrene-butadiene-styrene block copolymer, a styrene-butadiene rubber, a styrene-butadiene copolymer, an acrylonitrile-styrene copolymer, polyvinyl-pyrrolidone, polyvinyl alcohol, polyvinyl methyl ether, polyvinyl isobutyl ether, polyvinylformal, polyvinylbutyral, polyvinyl acetate, polyvinyl alcohol, polytrimethylene terephthalate, polysulfone, polysulphone, polystyrene, polyphenylene sulfide, polyphenylene ether, polypropylene, polyphthalamide, polyoxymethylene, polymethylpentene, polymethyl methacrylate, polymethacrylonitrile, polymethoxyacetal, polyisobutylene, thermoplastic polyamide, polyethylene terephthalate, polyether sulfone, polyethylene naphthalate, polyether nitrile, polyether imide, polyether ether ketone, polyethylene, polycarbonate, polybutylene terephthalate, polybutadiene styrene, polyparaphenylene benzobisoxazole, poly-n-butyl methacrylate, polybenzimidazole, polybutadiene acrylonitrile, polybutene-1, polyallylsulfone, polyallylate, polyacrylonitrile, a thermoplastic polyester alkyd resin, thermoplastic polyamide-imide, polyacrylic acid, polyamide, natural rubber, nitrile rubber, a methyl methacrylate-butadiene-styrene copolymer, polyethylene, isoprene rubber, ionomer, butyl rubber, a furan resin, an ethylene-vinyl alcohol copolymer, an ethylene-vinyl acetate copolymer, an ethylene-propylene-diene ternary copolymer, cellulose propionate, hydrin rubber, carboxymethyl cellulose, a cresol resin, cellulose acetate propionate, cellulose acetate butyrate, cellulose acetate, biasmaleimide triazine, cis-1.4-polybutadiene synthetic rubber, acrylonitrile-styrene-acrylate, an acrylonitrile-styrene copolymer, an acrylonitrile-ethylene-propylene-styrene copolymer, acrylic acid ester rubber, and polylactic acid. One of these resins is used alone, or two or more thereof are used in combination.

In the resin composition according to this exemplary embodiment, the content of the flame-retardant particle 10 is preferably from 1 to 100 parts by mass, more preferably from 5 to 50 parts by mass, per 100 parts by mass of the resin. If this content is less than 1 part by mass, the flame retardance tends to be insufficient, whereas if it exceeds 100 parts by mass, the mechanical strength of the resin formed body obtained is liable to decrease.

Incidentally, the resin composition according to this exemplary embodiment may further contain a flame retarder other than the above-described flame-retardant particle 10 (hereinafter, for the sake of convenience, this is referred to as "other flame retarders") as long as the effect of the resin composition is not impaired. Examples of the other flame retarders include a phosphorus-based flame retarder, a bromine-based flame retarder, a silicone-based flame retarder, and an inorganic particle-based flame retarder. From the standpoint of satisfying both the flame retardance and the mechanical strength, the total content of other flame retarders is preferably 10 mass % or less, more preferably 5 mass % or less, based on the entire solid content of the resin composition, and it is still more preferred not to contain other flame retarders.

Also, the resin composition according to this exemplary embodiment may further contain an additive such as antioxidant, reinforcing agent, compatibilizer, weathering agent, reinforcement and hydrolysis inhibitor, a catalyst and the like, if desired. The content of each of these additives and catalyst is preferably 5 mass % or less based on the entire solid content of the resin composition.

(Resin Formed Body)

The resin formed body according to the third exemplary embodiment comprises a resin and the above-described flame-retardant particle. Also, the rein formed body is obtained by shaping the above-described resin composition. Incidentally, the constituent components of the resin formed body according to this exemplary embodiment are the same as the constituent components of the resin composition according to the second exemplary embodiment and their redundant description is omitted here.

The resin formed body according to this exemplary embodiment is obtained, for example, by shaping the above-described resin composition by a known method such as injection molding, injection compression molding, press molding, extrusion molding, blow molding, calendar molding, coating molding, cast molding or dipping molding.

The resin formed body according to this exemplary embodiment is not particularly limited in its usage but is used, for example, for a casing or various parts of home electric appliances, office equipment or the like, a wrapping film, a housing box of CD-ROM, DVD or the like, tableware, a food tray, a beverage bottle, a medical wrapping material, an electric wire, a cable, a motor vehicle, a marine vessel, an airplane, a railway vehicle, a building material, an electronic vehicle, and a printed board, for the purpose of protection against a disaster due to heat from a fire or the like.

Figure 2:
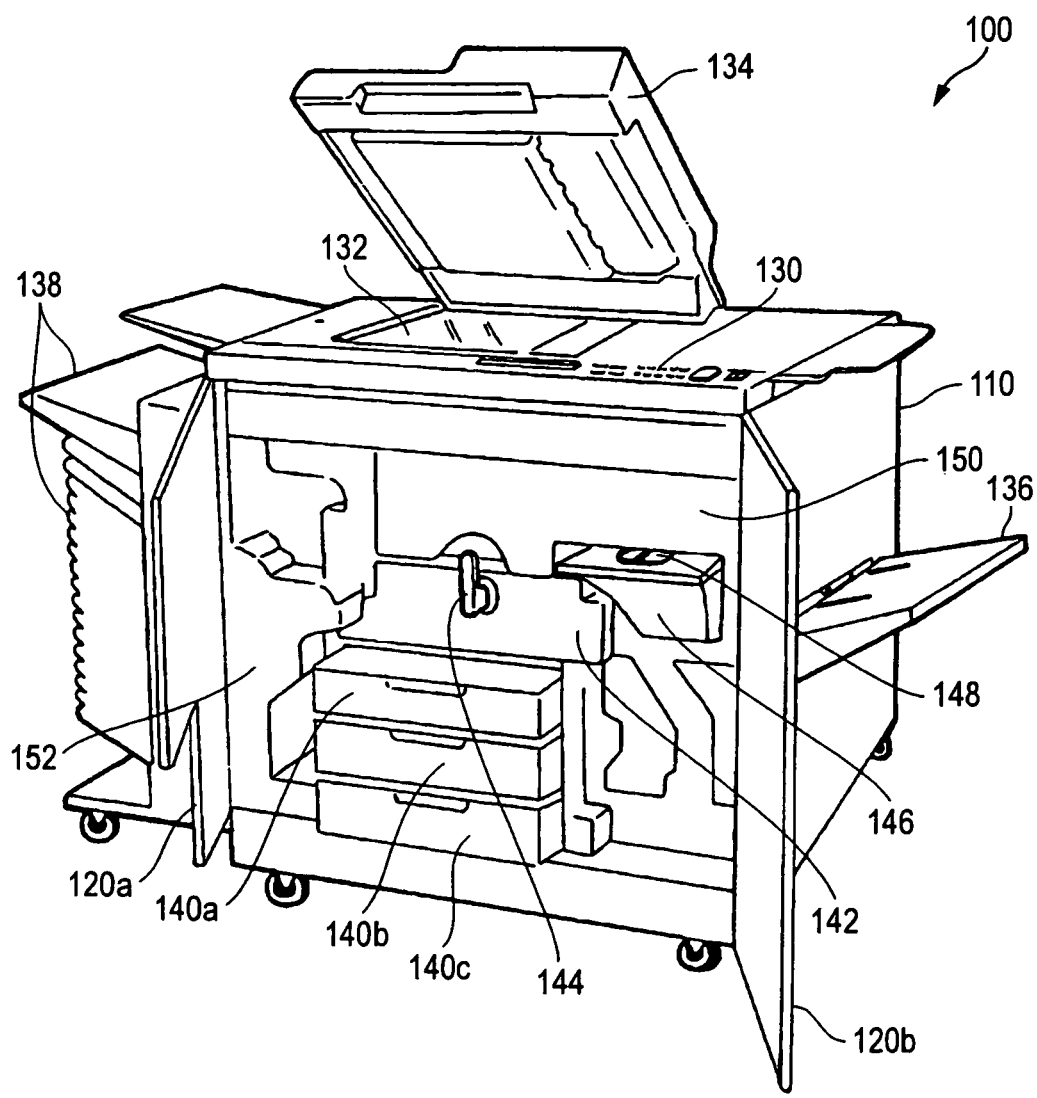
FIG. 2 illustrates an outer appearance perspective view showing an image forming apparatus comprising a casing according to one exemplary embodiment of the resin formed body of the present invention.

FIG. 2 is a view showing one example of an image forming apparatus comprising a casing produced using the resin formed body according to this exemplary embodiment and office equipment parts, which is an outer appearance perspective view when the image forming apparatus is seen from the front side. In FIG. 2, the image forming apparatus 100 comprises front covers 120a and 120b at the front of a main body apparatus 110. These front covers 120a and 120b are openable/closable so that an operator can operate the inside of the apparatus. By this construction, the operator can replenish the toner when the toner is consumed, replace the wasted process cartridge, or remove the jammed paper on occurrence of paper jamming inside of the apparatus. FIG. 2 shows the apparatus in a state of the front covers 120a and 120b being opened.

On the top of the main body apparatus 110, an operation panel 130 into which various conditions concerning the image formation, such as paper size and number of sheets, are input through the operation by an operator, and a copy glass 132 on which the original to be read is placed, are provided. The main body apparatus 110 also comprises, at the upper part thereof, an automatic original conveying device 134 capable of automatically conveying the original onto the copy glass 132. Furthermore, the main body apparatus 110 comprises an image reading device for scanning the original image disposed on the copy glass 132 and obtaining image data for reproducing the original image. The image data obtained by this image reading device are sent to an image forming unit through a control part. The image reading device and the control part are housed inside a casing 150 constituting a part of the main body apparatus 110. Also, the image forming unit is provided as a removable process cartridge 142 in the casing 150. The process cartridge 142 can be loaded or removed by turning an operation lever 144.

In the casing 150 of the main body apparatus 110, a toner housing part 146 is fixed, and a toner is replenished from a toner supply port 148. The toner housed in the toner housing part 146 is fed to a developing device.

In the lower part of the main body apparatus 110, paper housing cassettes 140a, 140b and 140c are provided. Also, in the main body apparatus 110, a plurality of conveying rollers each composed of a pair of rollers are arrayed inside of the apparatus, whereby a conveying path allowing the paper in the paper housing cassette to be conveyed to the image forming unit located above the cassette is formed. The paper in each paper housing cassette is taken out one by one by a paper take-out mechanism disposed near the end of the conveying path and delivered to the conveying path. A paper tray 136 for manual feeding is provided on the side surface of the main body apparatus 110, and the paper is fed also from this tray, if desired.

The paper on which an image is formed by the image forming unit is sequentially transferred between two fixing rolls abutting against each other and being supported by a casing 152 constituting a part of the main body apparatus 110 and then discharged outside the main body apparatus 110. In the main body apparatus 110, a plurality of discharge trays 138 are provided on the side opposite the side where the paper tray 136 is provided, and the paper after image formation is discharged to these trays.

In the image forming apparatus 100, the front covers 120a and 120b are often subject to a load such as stress and impact at the opening/closing, vibration during image formation, and heat generated inside of the image forming apparatus. Also, the process cartridge 142 is often subject to a load such as impact at the loading/removal, vibration during image formation, and heat generated inside of the image forming apparatus. Furthermore, the casing 150 and the casing 152 are often subject to a load such as vibration during image formation and heat generated inside of the image forming apparatus. Therefore, the resin formed body according to this exemplary embodiment is suitably used as the front covers 120a and 120b of the image forming apparatus 100, the exterior of the process cartridge 142, the casing 150 and the casing 152.

EXAMPLES

The exemplary embodiment of the invention is described in greater detail below by referring to Examples and Comparative Examples, but the exemplary embodiment of the present invention is not limited to the following Examples.

Example 1

A stirrer is placed in a 1,000 ml-volume glass flask and after introducing 10 g of poly(4-vinylphenol) having a weight average molecular weight of 20,000, the inside of the vessel is replaced with nitrogen. Thereto, 300 ml of dehydrated tetrahydrofuran and 12 ml of dehydrated triethylamine are added to dissolve the poly(4-vinylphenol). Subsequently, while cooling the inside of the system by using an ice bath, 10 ml of phenyl chloroformate is slowly added. Thereafter, the mixture is stirred at room temperature for 6 hours, and the reaction is stopped by charging 10 ml of methanol. The polymer is reprecipitated by charging the reaction solution into a large amount of methanol, then recovered by filtration and further washed with methanol several times, whereby 15 g of Compound (Polymer) A having a repeating unit represented by the following formula (2) and having a weight average molecular weight of 60,000 is obtained.

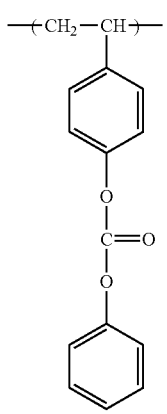

(2)

Then, 10 g of Compound A obtained is dissolved in 20 ml of ethyl acetate, and the resulting solution is added to a mixed aqueous solution containing 2.5 g of an aqueous dispersion of 40 mass % calcium carbonate (LUMINUS, trade name, produced by Maruo Calcium Co., Ltd., volume average particle diameter: 100 nm) and 50 ml of an aqueous 20 mass % saline solution, suspended with stirring for 1 hours and then subjected to solvent removal heating at a liquid temperature of 80° C., whereby Compound A was particulated and at the same time, the surface thereof is coated with calcium carbonate. The particle is then recovered by filtration, washed with distilled water and vacuum-dried to obtain the objective Flame-Retardant Particle A (volume average particle diameter: 4 μm, calcium carbonate content: 10 mass %).

Subsequently, 50 parts by mass of the obtained Flame-Retardant Particle A is added to 100 parts by mass of ABS resin (AT-05, trade name, produced by Nippon A&L Inc.), and the blend is melt-mixed at 180° C. in a twin-screw extruder and further melt-shaped by a press at 200° C. to produce a UL-94 burning test specimen (width: 13 mm, length: 125 mm, thickness: 2.0 mm).

Example 2

A stirrer is placed in a 1,000 ml-volume glass flask and after introducing 10 g of poly(4-vinylphenol) having a weight average molecular weight of 50,000, the inside of the vessel is replaced with nitrogen. Thereto, 300 ml of dehydrated tetrahydrofuran and 12 ml of dehydrated triethylamine are added to dissolve the poly(4-vinylphenol). Subsequently, while cooling the inside of the system by using an ice bath, 10 ml of phenyl chloroformate is slowly added. Thereafter, the mixture is stirred at room temperature for 6 hours, and the reaction is stopped by charging 20 ml of methanol. The polymer is reprecipitated by charging the reaction solution into a large amount of methanol, then recovered by filtration and further washed with methanol several times, whereby 15 g of Compound (Polymer) B having a repeating unit represented by formula (2) and having a weight average molecular weight of 8,000 is obtained.

Flame-Retardant Particle B (volume average particle diameter 4 μm, calcium carbonate content: 10 mass %) and a UL-94 burning test specimen (width: 13 mm, length: 125 mm, thickness: 2.0 ma) are produced in the same manner as in Example 1 except for using Compound B in place of Compound A.

Example 3

Flame-Retardant Particle C (volume average particle diameter: 4 μm, calcium carbonate content: 10 mass %) and a UL-94 burning test specimen (width: 13 mm, length: 125 mm, thickness: 2.0 mm) are produced in the same manner as in Example 1 except for adding a phosphorus-based flame retarder PX-200 (produced by Daihachi Chemical Industry Co., Ltd.) in an amount of 10 wt % based on Compound A.

Example 4

Flame-Retardant Particle D (volume average particle diameter: 4 μm, polystyrene crosslinked particle content: 10 mass %) and a UL-94 burning test specimen (width: 13 mm, length: 125 mm, thickness: 2.0 mm) are produced in the same manner as in Example 1 except that a polystyrene crosslinked particle (particle diameter: 120 nm) produced by emulsion polymerization is used in place of calcium carbonate.

Comparative Example 1

Compound A is produced by the same procedure as in Example 1. 50 Parts by mass of Compound A obtained is added to 100 parts by mass of ABS resin (AT-05, trade name, produced by Nippon A&L Inc.), and the blend is melt-mixed and then melt-shaped under the same conditions as in Example 1 to produce a UL-94 burning test specimen (width: 13 mm, length: 125 mm, thickness: 2.0 mm).

Comparative Example 2

Compound B is produced by the same procedure as in Example 2. 50 Parts by mass of Compound B obtained is added to 100 parts by mass of ABS resin (AT-05, trade name, produced by Nippon A&L Inc.), and the blend is melt-mixed and then melt-shaped under the same conditions as in Example 1 to produce a UL-94 burning test specimen (width: 13 mm, length: 125 mm, thickness: 2.0 mm).

Comparative Example 3

50 Parts by mass of calcium carbonate (LUMINUS, trade name, produced by Maruo Calcium Co., Ltd., volume average particle diameter: 100 nm) is added to 100 parts by mass of ABS resin (AT-OS, trade name, produced by Nippon A&L Inc.), and the blend is melt-mixed and then melt-shaped under the same conditions as in Example 1 to produce a UL-94 burning test specimen (width: 13 mm, length: 125 mm, thickness: 2.0 mm).

<Measurement of Residual Ratio>

Flame-Retardant Particles A and B and Compound (Polymer) A and B are subjected to a thermogravimetric analysis (TGA) as follows. That is, by using TGA-DTA2000S (trade name) manufactured by Seiko, the temperature is elevated from room temperature to 600° C. as a temperature rising rate of 20° C./min in a nitrogen stream and the residual ratio at 600° C. is measured. The results obtained are shown in Table 1.

TABLE 1

|  | Residual Ratio at 600° C. (mass %) |
|---|---|
| Flame-Retardant Particle A | 28 |
| Flame-Retardant Particle B | 26 |
| Flame-Retardant Particle C | 31 |
| Flame-Retardant Particle D | 14 |
| Compound A | 12 |
| Compound B | 10 |

<Evaluation of Flame Retardance>

Burning test specimens produced above are tested by a UL-94 vertical burning test and rated by four ranks of V-0, V-1, V-2 and burned according to the criteria of UL-94 Standards. The results obtained are shown in Table 2.

<Evaluation of Mechanical Strength (Charpy Impact Strength>

UL-94 Burning test specimens produced above are measured for the Charpy impact strength according to JIS K7111. The results obtained are shown in Table 2.

TABLE 2

|  | Flame Retardance | Charpy Impact Strength (KJ/m$^2$) |
| --- | --- | --- |
| Example 1 | V-2 | 7 |
| Example 2 | V-2 | 6 |
| Example 3 | V-2 | 7 |
| Example 4 | V-2 | 7 |
| Comparative Example 1 | burned | 4 |
| Comparative Example 2 | V-2 | 3 |
| Comparative Example 3 | burned | 3 |

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A flame-retardant particle, comprising:
a core particle containing a compound having a structure represented by formula (1):

-A(—O—CO—O—Ar)$_m$   (1)

wherein A represents a substituted or unsubstituted aromatic group; Ar represents a substituted or unsubstituted phenyl group; and m represents an integer of 1 to 3; and
a coating particle that covers at least a part of a surface of the core particle, the coating particle containing at least one inorganic member selected from the group consisting of basic lead carbonate, basic lead sulfate, lead sulfate, lithopone, calcium carbonate, gypsum, and basic magnesium carbonate,
wherein a content of the coating particle is from 5 to 100 parts by mass, per 100 parts by mass of the core particle, and
the compound having a structure represented by formula (1) forms a crosslinked structure.

2. The flame-retardant particle according to claim 1, wherein A represents an aromatic group having at least one substituent selected from the group consisting of an alkyl group having a carbon number of 1 to 10, a phenyl group, an alkoxyl group, an amino group, an amido group, an aryl group, an acyl group, a vinyl group, an allyl group, a hydroxy group, an ester group and a carboxyl group.

3. The flame-retardant particle according to claim 1, wherein Ar represents a phenyl group having at least one substituent selected from the group consisting of an alkyl group having a carbon number of 1 to 10, a phenyl group, an alkoxyl group, an amino group, an amido group, an aryl group, an acyl group, a vinyl group, an allyl group, a hydroxy group, an ester group and a carboxyl group.

4. The flame-retardant particle according to claim 1, wherein the core particle further contains at least one kind of a flame retarder selected from the group consisting of a phosphorus-based flame retarder and a nitrogen-based flame retarder.

5. The flame-retardant particle according to claim 4, wherein a content of the flame retarder is 1 mass % or more based on entire amount of the core particle.

6. The flame-retardant particle according to claim 1, which has a volume average particle diameter of 5 µm or less.

7. The flame-retardant particle according to claim 1, wherein a volume average particle diameter of the coating particle is ⅕ or less of a volume average particle diameter of the core particle.

8. A resin composition, comprising:
a resin; and
the flame-retardant particle according to claim 1.

9. The resin composition according to claim 8, wherein a content of the flame-retardant particle is from 1 to 100 parts by mass, per 100 parts by mass of the resin.

10. The resin composition according to claim 8, further comprising:
a flame retarder other than the flame-retardant particle.

11. A resin formed body, comprising:
a resin; and
the flame-retardant particle according to claim 1.

12. The resin formed body according to claim 11, wherein a content of the flame-retardant particle is from 1 to 100 parts by mass, per 100 parts by mass of the resin.

13. The resin formed body according to claim 11, further comprising:
a flame retarder other than the flame-retardant particle.

14. The flame-retardant particle according to claim 1, wherein the coating particle contains at least one inorganic oxide, the inorganic oxide being selected from the group consisting of muscovite, micanite, micalex, zinc oxide, titanium oxide, zirconium oxide, alumina, quartz, clay, silica, silicic acid, diatomaceous earth, talc, alumina white, gloss white, and satin white.

15. The flame-retardant particle according to claim 14, wherein the inorganic oxide is clay, and the clay includes a particle comprising beidellite, nontronite, saponite, hectorite, bentonite, or a derivative thereof.

* * * * *